N. H. BYERLEY.
Shutter-Fasteners.
No. 135,319.                           Patented Jan. 28, 1873.
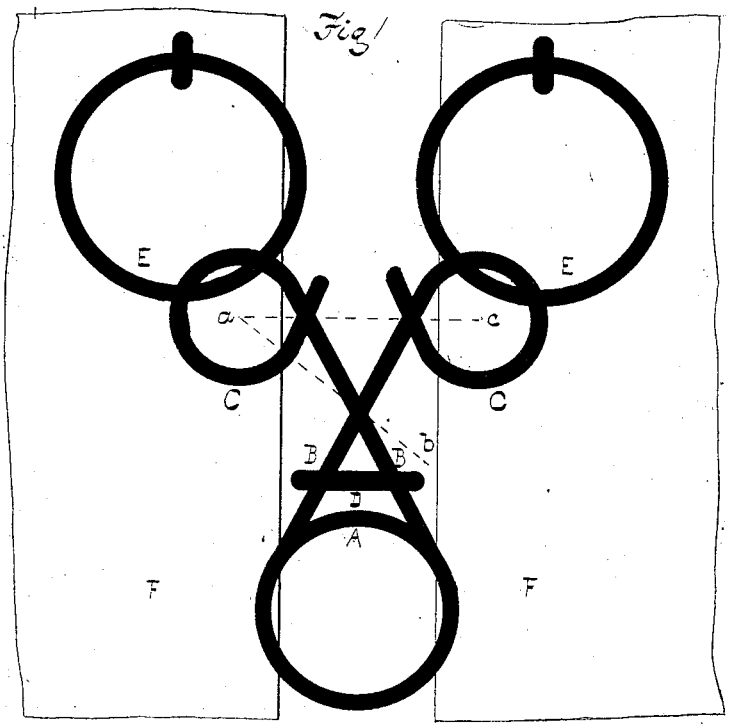
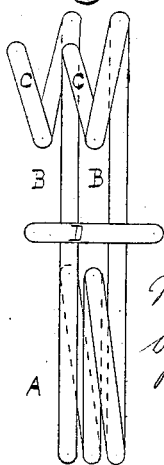

UNITED STATES PATENT OFFICE.

NICHOLAS H. BYERLEY, OF PHILADELPHIA, PENNSYLVANIA.

IMPROVEMENT IN SHUTTER-FASTENERS.

Specification forming part of Letters Patent No. 135,319, dated January 28, 1873.

*To all whom it may concern:*

Be it known that I, NICHOLAS H. BYERLEY, of the city and county of Philadelphia and State of Pennsylvania, have invented an Improved Shutter-Fastener, of which the following is a specification:

The invention relates to a shutter-fastener; and consists in a spiral or coil spring of brass or other wire; the ends of the lengths or arms are looped or hooked to take into the rings of the window-shutter; and a graduating or tightening ring embraces the arms to contract the extension of the same.

Figure 1 shows the fastener in place on the rings of a pair of window-shutters. Fig. 2 is an end view of the fastener.

A is a spiral spring of any number of coils. B are its arms, which cross each other and terminate in the loops or hooks C. D is a tightening and adjusting ring on the arms of the spring.

As shown in Fig. 1, the loops C take into the rings E of the shutters F, and keep them from opening or spreading in high winds; the creaking of the shutters is prevented by the yielding of the spring, which gives sufficiently to accommodate to any strains.

When it is desirable to bring the shutters closer together than shown at Fig. 1, the ring D is slipped over one of the hooks C, as shown at *a b*, dotted lines; to bring them still closer together the ring must be put over both hooks, as shown at *a c*, dotted lines.

I claim as my invention—

The spiral spring A, with its arms B and loops or hooks C, in combination with the tightening-ring D, substantially for the purpose shown and described.

In testimony whereof I hereunto sign my name in presence of two subscribing witnesses.

NICHOLAS H. BYERLEY.

Witnesses:
   FRANCIS D. PASTORIUS,
   EDMUND P. COCHRAN.